Sept. 20, 1927.

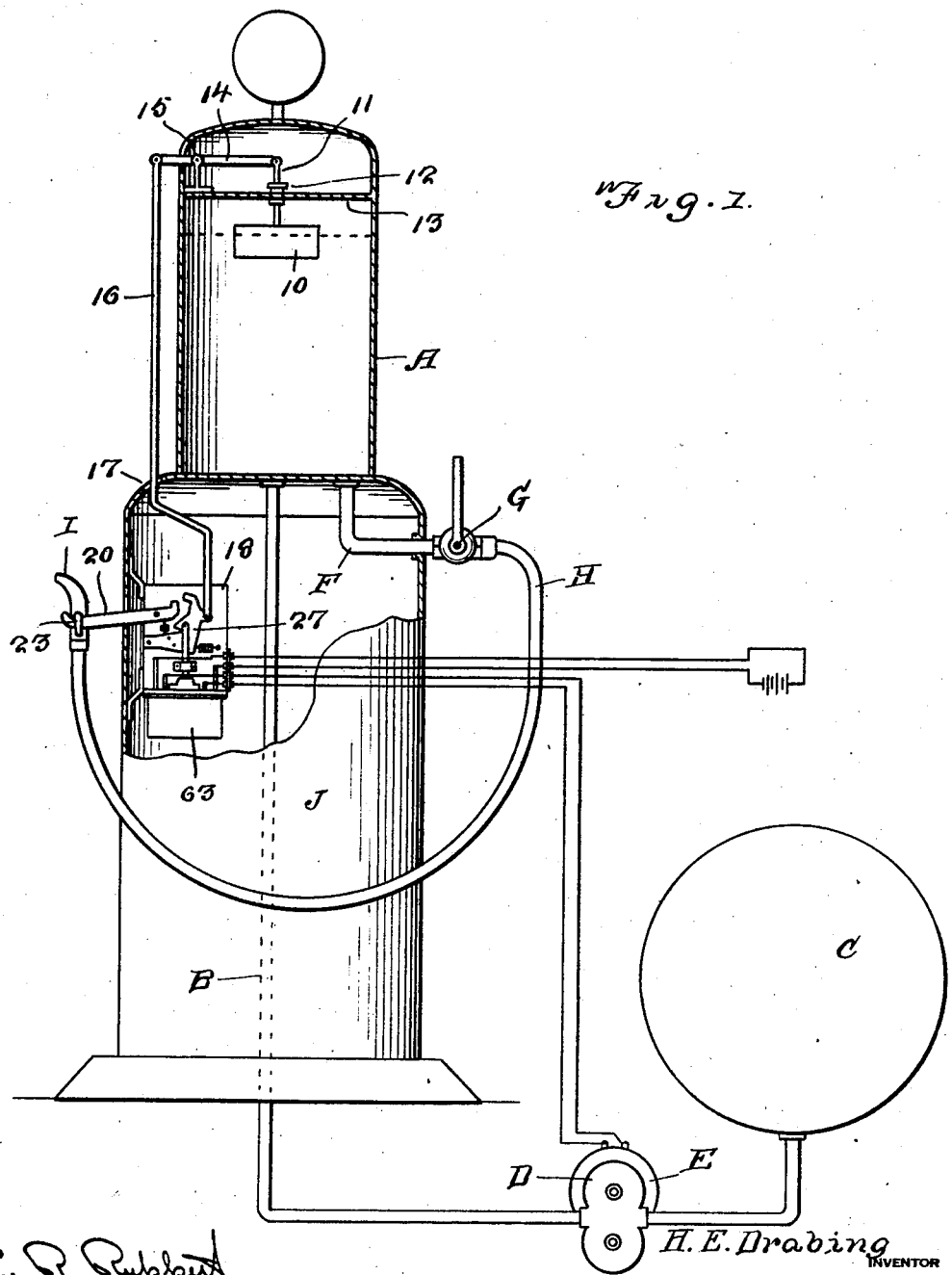

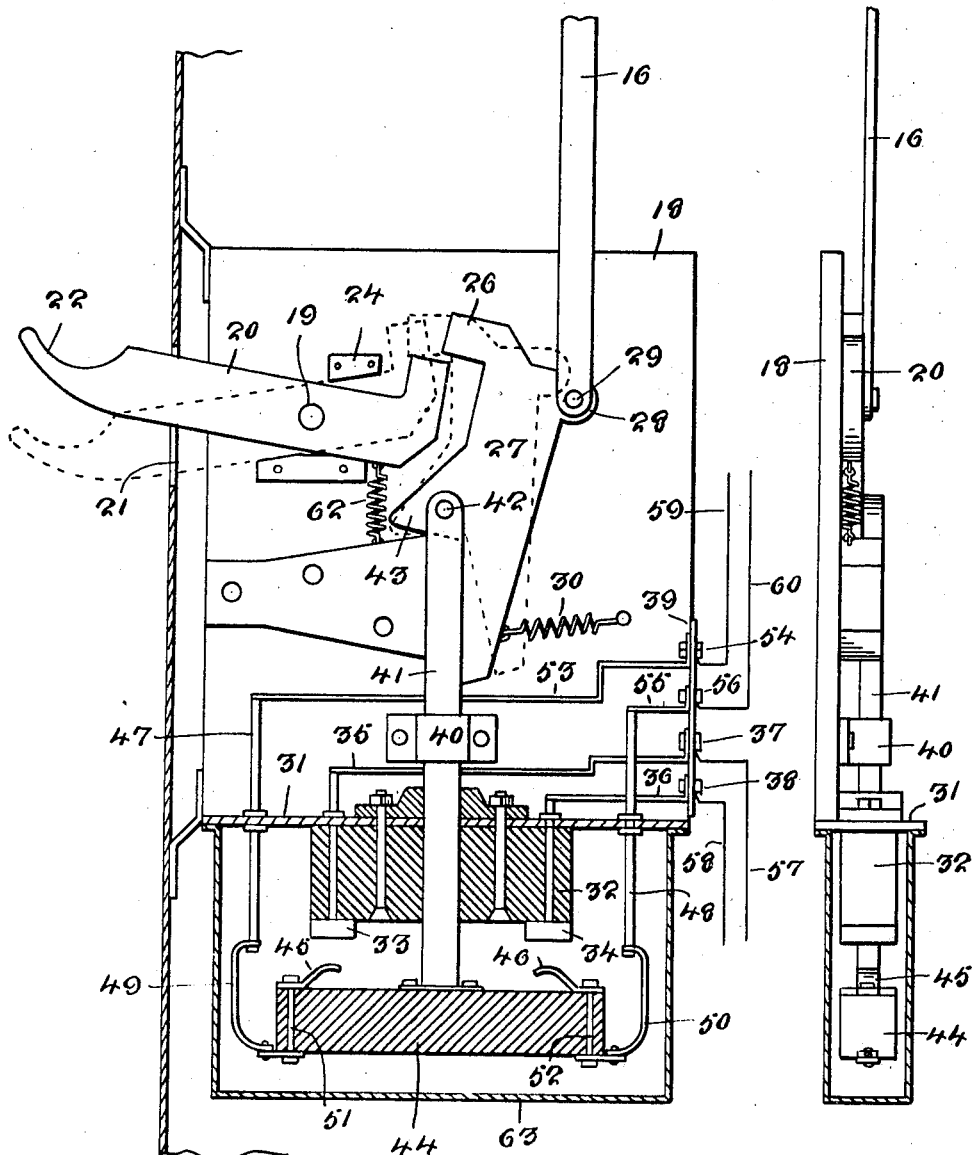

H. E. DRABING 1,643,239

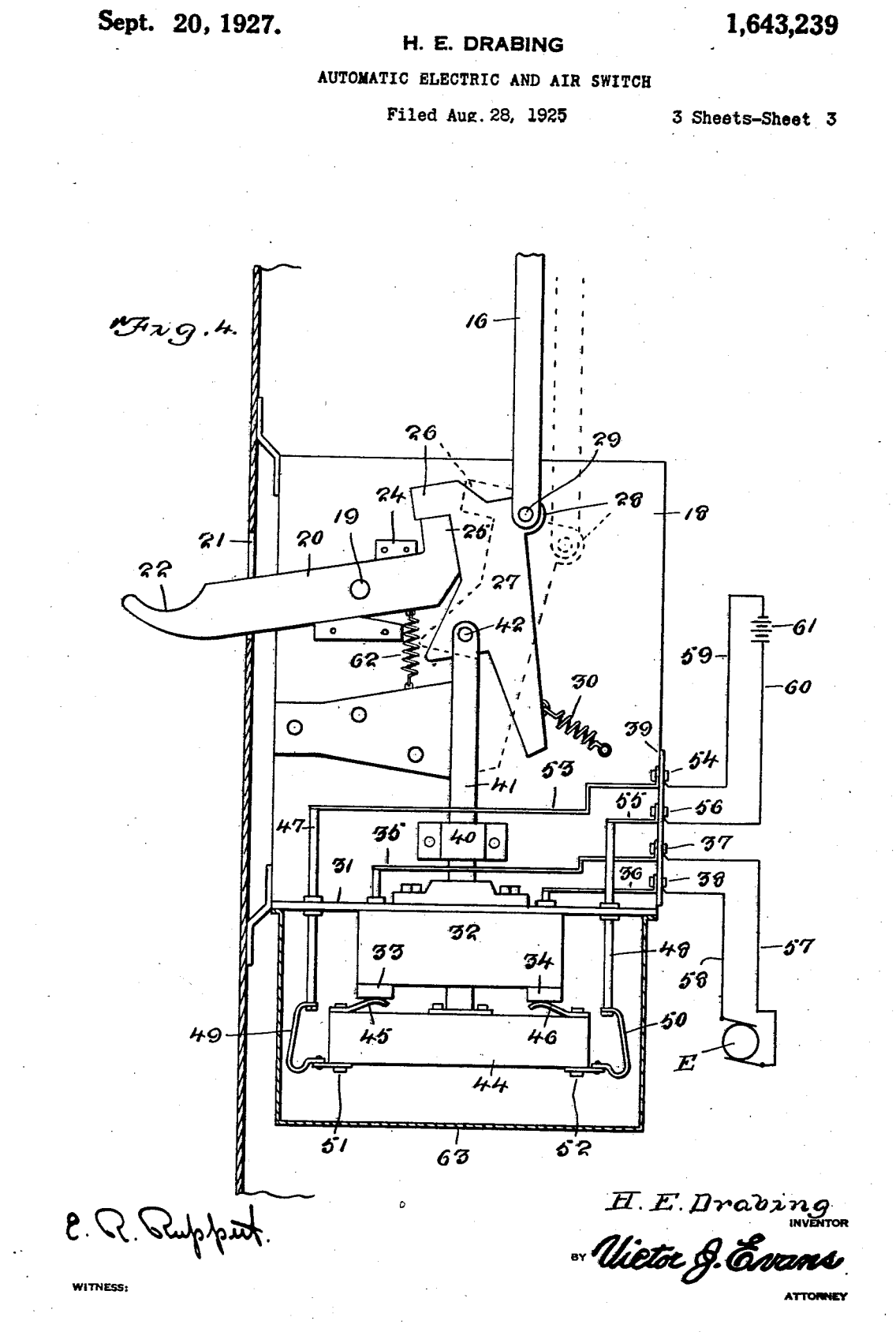

AUTOMATIC ELECTRIC AND AIR SWITCH

Filed Aug. 28, 1925

Patented Sept. 20, 1927.

1,643,239

UNITED STATES PATENT OFFICE.

HENRY ELLSWORTH DRABING, OF MOUNDS, ILLINOIS.

AUTOMATIC ELECTRIC AND AIR SWITCH.

Application filed August 28, 1925. Serial No. 53,171.

This invention relates primarily to electric switches and operating means therefor and has for its object the provision of a novel switch device and operating means therefor adapted particularly for use in connection with gasoline or other liquid dispensing tanks or pumps and operating automatically to control the energization of an electric motor provided in association with a pump device for the purpose of replenishing the supply automatically in the dispensing apparatus subsequent to the withdrawal of any liquid therefrom.

An important object is the provision of a device of this character provided with means upon which the outlet or discharge hose or nozzle may be engaged when not in use, the weight of the hose acting to throw the switch into operative position for closing the circuit to the electric motor of the pump device, float actuated means being provided within the tank for controlling certain elements of the switch device and rendering the switch inoperative when the tank of the dispensing device has been refilled.

A further object of the invention is to provide a control device of this character in which the parts are so arranged that when the dispensing tank is full the switch cannot be operated to close the circuit to the motor of the pump mechanism, a feature of advantage in avoiding the production of excessive pressure in the tank.

A further object is to provide a switch operated mechanism and switch in which the make and break will occur within a body of oil so as to prevent ignition of any fumes which may be in the air about the dispensing device.

Broadly speaking, the invention consists in the provision of a float controlled by the liquid level within the tank of a dispensing pump device for automatically controlling the position of a switch, an air valve handle or other similar control device which may be used in association with a siphon apparatus, air pump apparatus or other equivalent means provided for the purpose of supplying liquid into the tank of a dispensing pump or other similar device.

An additional object is to provide a mechanism of this character which will be comparatively simple and inexpensive in manufacture, easy to install, positive and automatic in action, efficient and durable in service, and a general improvement in the art.

With the above and other objects and advantages in view, the invention consists in the details of construction and the arrangement and combination of parts to be hereinafter more fully described and claimed, and illustrated in the accompanying drawings, in which:—

Figure 1 is a side elevation, with parts broken away and in section illustrating the invention as applied to a gasoline dispensing pump.

Figure 2 is an enlarged elevation of the switch actuating mechanism, the switch itself being shown in section, all the parts being in a certain position at one limit of their movement and certain movement being illustrated by dotted lines.

Figure 3 is an elevation taken at right angles to Figure 2.

Figure 4 is a view similar to Figure 2 with the parts in a different position and the switch closed.

Referring more particularly to the drawings, I have illustrated in Figure 1 a conventional type of gasoline dispensing pump including a suitable receptacle or tank A, into which gasoline or other liquid is forced through a supply pipe B from a reservoir C, the means for supplying the liquid including a suitable pump D driven by an electric motor E of any desired type. In pumps of this character it is customary to provide an outlet pipe F equipped with a cut-off valve G and having connected therewith a flexible hose H carrying a discharge nozzle I. Ordinarily the tank A is mounted upon a hollow standard or base J within which is mounted the mechanism forming the subject matter of the invention.

In carrying out the invention, I provide a float 10 located within the tank A carried by the lower end of a stem 11 which is slidable through a suitable bushing 12 in a partition member 13. This stem is loosely pivotally connected at one end with a lever 14 pivoted intermediate its ends upon a bracket 15 and having pivotally connected with its other end a depending rod 16 which extends through a suitable hole 17 into the hollow base or standard J for a purpose to be described.

Suitably mounted within the standard or base J is a supporting panel 18 upon which is pivoted, at 19, an arm 20 which is vertically swingable and which operates through an elongated slot 21 formed in the side of the base or standard, the outer or projecting end of this arm being preferably concaved or otherwise formed as indicated at 22 to permit engagement thereon of a hook or lug 23 on the discharge nozzle I. This arm 20 is an important element inasmuch as it actuates the switch mechanism to be described. It will be observed that movement of the arm in one direction is limited by a suitable stop 24 mounted on the panel. The inner end of the arm 20 is formed with an upward extension 25 which cooperates with a lateral extension 26 on the upper end of a dog 27 which is provided at its opposite side with an ear 28 to which the lower end of the rod 16 is pivotally connected at 29. A suitably mounted coil spring 30 is located on the panel and is connected with the lower end portion of the dog 27 for the purpose of normally urging it in one direction as indicated by dotted lines in Figure 2.

In the present instance, I have illustrated a switch device controlled by these above described parts, which switch device is shown as comprising a horizontal support 31 at the lower portion of the panel provided at its underside with a block or other supporting member 32 of suitable insulating material on which are mounted spaced contacts 33 and 34 connected by conductors 35 and 36 respectively with suitable binding posts or the like 37 and 38 on an auxiliary panel or strip 39 mounted preferably at one edge of the main panel 18. Mounted above the horizontal support 31 is a guide 40 through which is slidable a stem or plunger 41 which has its upper end pivotally connected at 42 with a lateral projection 43 at the intermediate portion of the dog 27. At its lower end the stem or plunger 41 carries a member 44 of suitable insulating material on which are mounted spring contacts 45 and 46 adapted to be brought into engagement with the contacts 33 and 34 respectively. Extending through and insulated from the horizontal partition member 31, or support as it may be called, are rods 47 and 48 to which are connected flexible conductors 49 and 50 respectively connected with the bolts or screws 51 and 52 which hold the contacts 45 and 46 in place. Leading from the member 47 is a conductor 53 connected with a binding post 54 on the strip 39, and leading from the member 48 is a similar conductor 55 connected with a binding post 56 on the strip 39.

The electrical connections externally of the device are as follows: The terminals of the motor E are connected by conductors 57 and 58 with the binding posts 37 and 38 while connected with the binding posts 54 and 56 are conductors 59 and 60 connected with the poles of a suitable source of current 61 which may be an ordinary lighting circuit. Quite naturally, there are no limitations in this respect as the motor may be operated by batteries if such is preferred for any reason.

Assuming that the tank A is full up to the level indicated by the dotted line in Figure 1, the normal condition of affairs is for the hose to be hooked onto the arm 20 by means of the member 23, the valve G being of course closed to prevent the liquid within the tank from running out. When a customer then purchases the gasoline or other liquid, the operator removes the nozzle I from the arm 20 and opens the valve G so that the contents of the tank A may be discharged into the tank of an automobile or any other receptacle. Just as soon as this is done, the level of the liquid within the tank A begins to lower whereupon the rod 16 moves upwardly. Of course the moment that the nozzle is disengaged from the arm 20 the latter will be moved upwardly into the full line position shown in Figure 2 by means of the coil spring illustrated at 62. As a matter of fact the arm 20 swings upwardly into this position prior to the movement of the rod 16 but when the rod 16 is moved upwardly the dog 27 will swing from its normal full line position shown in Figure 2 into the dotted line position shown in the same figure, the extension 26 of the dog engaging over the extension 25 on the arm 20. This sets the mechanism for actuation of the switch. After the desired quantity of liquid has been withdrawn from the tank A, the operator replaces the nozzle I upon the arm 20, whereupon the arm 20 is swung downwardly into the dotted line position shown in Figure 2, the extension 25 engaged beneath the extension 26 on the dog then causing the dog 27 to be moved upwardly, carrying with it the stem or plunger 41 on which is mounted the member 44 carrying the contacts 45 and 46. Naturally, these contacts will be brought into engagement with the contacts 33 and 34, thus automatically closing the circuit to the motor E so that the pump mechanism D will be operated to replenish the supply of liquid within the tank A. Just as soon as the level of the liquid within the tank A reaches the normal position shown by the dotted lines in Figure 1, the float 10 will be moved upwardly and the rod 16 moved downwardly. This downward movement of the rod 16 will cause the dog 27 to be swung out of the position shown by dotted lines in Figure 2 into the full line position shown in the same figure, the extension 26 being then out of obstructing relation to the path of movement of the extension 25. The parts will be retained in this position until liquid is subsequently withdrawn from the tank A. At such a time it will be observed that no matter how freely the arm 20 may be moved up and down it can have no effect whatsoever upon the dog 27 which is in its released position. It is consequently impossible to supply any more liquid to the tank A and any development of excess pressure therein will be entirely avoided. As soon as the tank has been refilled and the rod 16 moved downwardly so that the dog 27 disengages the extension 25, the weight of the member 44 carrying the contact will cause it to descend to its normal position shown in Figure 2. the contacts 45 and 46 disengaging the contacts 33 and 34 so that the circuit to the motor E will be broken and the latter deenergized. It is preferable to provide a casing or cup 63 surrounding the switch and filled with oil at least to a certain level so that the make and break between the contacts will occur within the oil and thus prevent any danger of igniting fumes which may be in the air in the vicinity of the device.

From the foregoing description and a study of the drawings, it will be apparent that I have thus provided a very simple automatic device for the purpose specified which will be a great saver of time and annoyance in the use of gasoline or other liquid dispensing pump. While the device or operating means has been described as used for controlling a switch, it should of course be distinctly understood that by omitting the switch device itself the rod or plunger 41 may be used for controlling the position of an air valve handle or the like so that the device would be equally capable of employment in connection with a siphon system or with an air operated pump system used in connection with gasoline dispensing devices or the like. Furthermore, it is of course apparent that the device need not be used in connection with a dispensing pump as it could be used in connection with any type of receptacle or tank from which liquid is withdrawn from time to time. As a matter of fact, I reserve the right to make all such changes in the form, construction and arrangement of parts as will not depart from the spirit of the invention or the scope of the subjoined claims.

Having thus described the invention, I claim.

1. In combination with a liquid dispensing pump, and a motor driven means for replenishing the supply therein, an automatic control device for the motor comprising a float carrying a rod, stationary contacts, a member of insulating material carrying spaced contacts adapted to cooperate with said stationary contacts, a stem connected with said member of insulating material, a dog pivoted upon said stem and having a shoulder thereon, a rod pivotally connected with the dog at a point laterally of the pivotal mounting of the dog and operatively connected with said float rod, and a pivoted arm having an extension thereon coacting with the shoulder on the dog, the arm being adapted to serve as a support for the draw-off hose of the dispensing pump.

2. In combination with a liquid dispensing device having a tank provided with a discharge hose and pump means for supplying liquid to the tank, a power device for driving said pump means, a control element for controlling said power device, a float mounted within the tank, a rod connected with and moved by the float, a dog pivotally carried by the rod and operatively connected with said control element, said dog having an extension thereon, and a pivoted arm having an extension cooperating with the extension on the dog and adapted to support said outlet hose when no liquid is being withdrawn from the tank.

3. In combination with a liquid dispensing device including a tank, and having a motor driven pump for supplying liquid thereto, the tank having a discharge hose, an automatic control for the motor comprising a float mounted within the tank and carrying a rod, a dog pivotally connected with said rod, the dog having a lateral extension thereon, stationary contacts, a stem pivotally connected with the dog at a point out of alinement with the point of its connection with the rod, a member carried by the stem and equipped with contacts adapted to engage said first named contacts, and a pivoted arm formed with an extension cooperating with the extension on the dog, said arm being adapted to serve as a support for said hose when no liquid is being withdrawn from the tank, all of said contacts being interposed in circuit between a source of current and the motor.

In testimony whereof I affix my signature.

HENRY ELLSWORTH DRABING.